No. 712,668. Patented Nov. 4, 1902.
W. N. GOVE.
GRAVITY BATTERY.
(Application filed Jan. 16, 1902.)
(No Model.)

Witnesses
Inventor
Wilfred N. Gove
By Attorneys

United States Patent Office.

WILFRED N. GOVE, OF PHILADELPHIA, PENNSYLVANIA.

GRAVITY-BATTERY.

SPECIFICATION forming part of Letters Patent No. 712,668, dated November 4, 1902.

Application filed January 16, 1902. Serial No. 90,086. (No model.)

*To all whom it may concern:*

Be it known that I, WILFRED N. GOVE, a citizen of the United States, residing at Philadelphia, in the county of Philadelphia and State of Pennsylvania, have invented certain new and useful Improvements in Gravity-Batteries; and I do declare the following to be a full, clear, and exact description of the invention, such as will enable others skilled in the art to which it appertains to make and use the same.

The invention relates to a gravity-battery.

The object of the invention is to provide a battery of this character of high power and of great durability.

The invention consists particularly in the substitution for the copper element usually employed in batteries of this character of an element composed solely of Babbitt metal, which by experiment has been demonstrated to materially increase the strength of the battery and which is not so susceptible of decomposition as the copper now so generally used.

Figure 1:
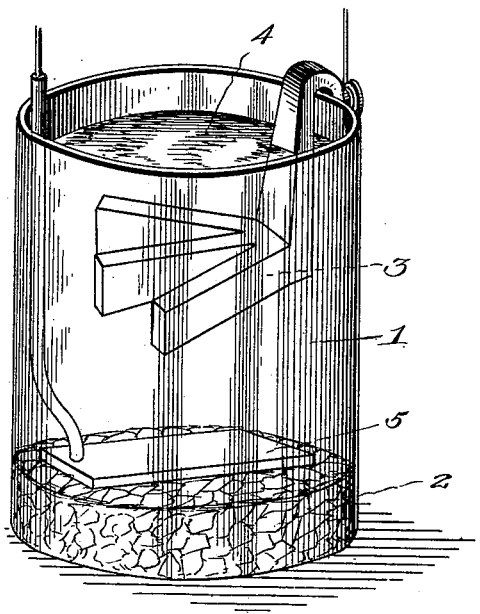
Figure 2:
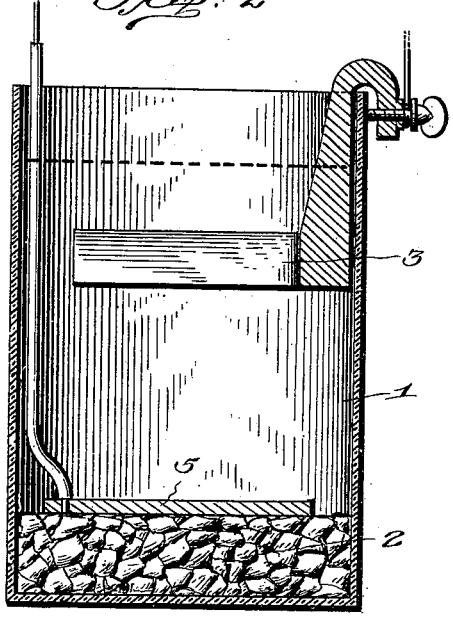
Figure 3:
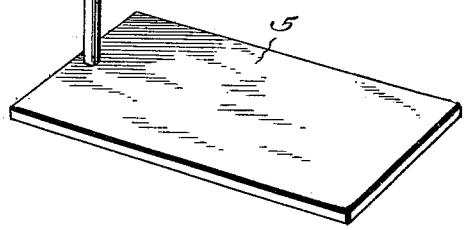

In the accompanying drawings, Figure 1 is a perspective view of a battery embodying my invention. Fig. 2 is a longitudinal vertical sectional view. Fig. 3 is a view of the Babbitt-metal element of the battery.

Referring now more particularly to the drawings, the numeral 1 represents the cell of the battery; 2, the blue-stone; 3, the zinc; 4, the solution, and 5 the Babbitt-metal element of the battery. This element 5 of the battery is preferably made in the form of a plate of any suitable dimensions and outlines and is arranged in the cell in a horizontal plane, so that instead of having its edges attacked and the consequent decomposition of metal at these points the decomposition is gradual upon the surface of the plate and is hardly noticeable until after several months' usage of the battery. It is believed that this result is attained by the employment of the alloy Babbitt metal, and it has been demonstrated in practice that one jar or cell containing Babbitt metal as one of the elements of the battery is equal in strength to two jars or cells in series in which copper is employed as one of the elements of the battery.

Each cell of my improved battery has an electromotive force of 1.20 volts, and it has been found that one cell was capable of furnishing sufficient electromotive force to work a four-ohm-resistance telegraphic sounder.

From the foregoing description, taken in connection with the accompanying drawings, the construction, mode of operation, and advantages of my improved battery will, it is thought, be readily apparent without requiring a more extended explanation.

Various changes in the form, proportion, and the minor details of construction may be resorted to without departing from the spirit or sacrificing any of the advantages of this invention.

Having thus described my invention, what I claim as new, and desire to secure by Letters Patent, is—

1. Babbitt metal as an element of a battery.
2. A gravity-battery composed of a solution, blue-stone, zinc and Babbitt metal.
3. A gravity-battery composed of a solution, blue-stone, zinc, and Babbitt metal, said Babbitt metal being in the form of a plate the surface of which is parallel with that of the solution.
4. A plate of Babbitt metal as an element of a battery.
5. A plate of Babbitt metal arranged in a horizontal plane, as an element of a gravity-battery.

In testimony whereof I have hereunto set my hand in presence of two subscribing witnesses.

WILFRED N. GOVE.

Witnesses:
BENJ. G. COWL,
E. F. CAVERLY.